United States Patent
Achten et al.

(10) Patent No.: US 11,833,749 B2
(45) Date of Patent: Dec. 5, 2023

(54) METHOD FOR PRODUCING A TREATED, 3D PRINTED OBJECT

(71) Applicant: Covestro Deutschland AG, Leverkusen (DE)

(72) Inventors: Dirk Achten, Leverkusen (DE); Thomas Buesgen, Leverkusen (DE); Roland Wagner, Leverkusen (DE); Jonas Kuenzel, Leverkusen (DE); Michael Kessler, Cologne (DE); Bettina Mettmann, Dormagen (DE)

(73) Assignee: STRATASYS, INC., Eden Prairie, MN (US)

( * ) Notice: Subject to any disclaimer, the term of this patent is extended or adjusted under 35 U.S.C. 154(b) by 455 days.

(21) Appl. No.: 16/763,591

(22) PCT Filed: Dec. 18, 2018

(86) PCT No.: PCT/EP2018/085547
§ 371 (c)(1),
(2) Date: May 13, 2020

(87) PCT Pub. No.: WO2019/121718
PCT Pub. Date: Jun. 27, 2019

(65) Prior Publication Data
US 2020/0306829 A1 Oct. 1, 2020

(30) Foreign Application Priority Data

Dec. 19, 2017 (EP) .................................. 17208280

(51) Int. Cl.
| | | |
|---|---|---|
| *B29C 64/165* | (2017.01) | |
| *B22F 1/105* | (2022.01) | |
| *B29C 64/30* | (2017.01) | |
| *B29C 71/02* | (2006.01) | |
| *B33Y 40/20* | (2020.01) | |
| *B22F 10/14* | (2021.01) | |
| *B33Y 10/00* | (2015.01) | |
| *B22F 10/38* | (2021.01) | |
| *B22F 10/62* | (2021.01) | |

(52) U.S. Cl.
CPC ............ *B29C 64/165* (2017.08); *B22F 1/105* (2022.01); *B22F 10/14* (2021.01); *B29C 64/30* (2017.08); *B29C 71/02* (2013.01); *B33Y 40/20* (2020.01); *B22F 10/38* (2021.01); *B22F 10/62* (2021.01); *B22F 2302/253* (2013.01); *B22F 2302/256* (2013.01); *B29C 2071/027* (2013.01); *B33Y 10/00* (2014.12)

(58) Field of Classification Search
CPC ....... B29C 64/165; B29C 64/30; B22F 12/00; B22F 10/38; B22F 10/62
See application file for complete search history.

(56) References Cited

U.S. PATENT DOCUMENTS

| | | | |
|---|---|---|---|
| 5,204,055 A | 4/1993 | Sachs et al. | |
| 6,713,125 B1 | 3/2004 | Sherwood et al. | |
| 7,431,987 B2* | 10/2008 | Pfeifer | B33Y 70/00 |
| | | | 428/323 |
| 7,879,282 B2 | 2/2011 | Hopkinson et al. | |
| 8,535,036 B2 | 9/2013 | Hopkinson et al. | |
| 9,757,801 B2* | 9/2017 | Günster | B22F 10/62 |
| 11,434,587 B2* | 9/2022 | Kopping | B29C 64/40 |
| 2005/0080191 A1 | 4/2005 | Kramer et al. | |
| 2015/0158249 A1* | 6/2015 | Goto | B33Y 30/00 |
| | | | 425/141 |
| 2016/0368054 A1* | 12/2016 | Ng | B33Y 50/02 |

FOREIGN PATENT DOCUMENTS

| | | |
|---|---|---|
| DE | 10158233 A1 | 3/2003 |
| WO | WO 9828124 A2 | 7/1998 |

OTHER PUBLICATIONS

International Search Report, PCT/EP2018/085547, dated Apr. 8, 2019, Authorized officer: Wendelin Utrata.
Dupin, S. et al, Microstructural origin of physical and mechanical properties of polyamide 12 processed by laser sintering, European Polymer Journal 48 (2012), pp. 1611-1621.
Utela, B. et al, A review of process development steps for new material systems in three dimensional printing (3DP), Journal of Manufacturing Processes, Society of Manufacturing Engineers, Dearborn, MI, vol. 10, No. 2, Jul. 1, 2008, pp. 96-104.

* cited by examiner

*Primary Examiner* — Nahida Sultana
(74) *Attorney, Agent, or Firm* — Faegre Drinker Biddle & Reath LLP

(57) ABSTRACT

The present invention relates to a method for producing a treated object, comprising the steps of: applying a layer of particles to a target area; applying a liquid binder to a selected portion of the layer in accordance with a cross-section of the object, so that the particles in the selected portion are bonded; repeating the steps of applying a layer of particles and applying a binder for a plurality of layers so that the bonded portions of the adjacent layers are bonded to form an object, wherein at least a part of the particles comprises a meltable polymer. A binder which cures by cross-linking is preferably selected as the binder. The obtained object is at least partially contacted with a liquid heated to ≥T or with a powder bed heated to ≥T in order to obtain the treated object. T represents a temperature of ≥25° C., the liquid does not represent a solvent or a reaction partner for the binder present in the object and the meltable polymer, and the powder bed is different from the particles of the meltable polymer. The invention also relates to a treated object that can be obtained by the method according to the invention.

13 Claims, No Drawings

METHOD FOR PRODUCING A TREATED, 3D PRINTED OBJECT

CROSS-REFERENCE TO RELATED APPLICATION

This application is a national stage application under 35 U.S.C. § 371 of PCT/EP2018/085547, filed Dec. 18, 2018, which claims the benefit of European Application No. 17208280, filed Dec. 19, 2017, each of which is incorporated herein by reference.

FIELD

The present invention relates to a method of producing a treated article, comprising the steps of: applying a layer of particles to a target surface; applying a liquid binder to a selected portion of the layer corresponding to a cross section of the article, such that the particles in the selected portion are bonded; repeating the steps of applying and applying binder for a multitude of layers, such that the bonded portions of the adjacent layers become bonded in order to obtain an article, where at least some of the particles include a fusible polymer. The invention further relates to a treated article obtainable by the method of the invention.

BACKGROUND

Additive manufacturing methods refer to those methods by which articles are built up layer by layer. They therefore differ markedly from other methods of producing articles such as milling or drilling. In the latter methods, an article is processed such that it takes on its final geometry via removal of material.

Additive manufacturing methods use different materials and processing techniques to build up articles layer by layer. In fused deposition modeling (FDM), for example, a thermoplastic wire is liquefied and deposited layer by layer on a movable build platform using a nozzle. Solidification gives rise to a solid article. The nozzle and build platform are controlled on the basis of a CAD drawing of the article. If the geometry of this article is complex, for example with geometric undercuts, support materials additionally have to be printed and removed again after completion of the article.

In addition, there exist additive manufacturing methods that use thermoplastic powders to build up articles layer by layer. In this case, by means of what is called a coater, thin layers of powder are applied and then selectively melted by means of an energy source. The surrounding powder here supports the component geometry. Complex geometries can thus be manufactured more economically than in the above-described FDM method. Moreover, different articles can be arranged or manufactured in a tightly packed manner in what is called the powder bed. Owing to these advantages, powder-based additive manufacturing methods are among the most economically viable additive manufacturing methods on the market. They are therefore used predominantly by industrial users. Examples of powder-based additive manufacturing methods are what are called selective laser sintering (SLS) or high-speed sintering (HSS). They differ from one another in the method for introducing the energy for the selective melting into the plastic. In the laser sintering method, the energy is introduced via a deflected laser beam. In what is called the high-speed sintering (HSS) method (EP 1648686), the energy is introduced via infrared (IR) sources in combination with an IR absorber selectively printed into the powder bed. What is called selective heat sintering (SHS) utilizes the printing unit of a conventional thermal printer in order to selectively melt thermoplastic powders.

On the basis of the polymers that are nowadays used predominantly in powder-based additive manufacturing methods, articles are formed that have mechanical properties that can differ fundamentally from the characteristics of the materials as known in other plastics processing methods, such as injection molding. When processed by the additive manufacturing methods, the thermoplastic materials used lose their specific characteristics.

Nylon-12 (PA12) is the material currently most commonly used for powder-based additive manufacturing methods, for example laser sintering. PA12 is notable for high strength and toughness when it is processed by injection molding or by extrusion. A commercial PA12, for example, after injection molding has an elongation at break of more than 200%. PA12 articles that are produced by the laser sintering method, by contrast, show elongations at break around 15%. The component is brittle and therefore can no longer be regarded as a typical PA12 component. The same is true of polypropylene (PP), which is supplied in powder form for laser sintering. This material too becomes brittle and hence loses the tough, elastic properties that are typical of PP. The reasons for this are to be found in the morphology of the polymers.

During the melting operation by means of laser or IR and especially in the course of cooling, an irregular inner structure of the so-called semicrystalline polymers arises (for example PA12 and PP). The inner structure (morphology) of semicrystalline polymers is partly characterized by a high level of order. A certain proportion of the polymer chains forms crystalline, tightly packed structures in the course of cooling. During melting and cooling, these crystallites grow irregularly at the boundaries of the incompletely molten particles and at the former grain boundaries of the powder particles and on additives present in the powder. The irregularity of the morphology thus formed promotes the formation of cracks under mechanical stress. The residual porosity which is unavoidable in the powder-based additive method promotes the growth of cracks.

Brittle properties of the components thus formed are the result. For elucidation of these effects, reference is made to European Polymer Journal 48 (2012), pages 1611-1621. The elastic polymers based on block copolymers that are used in laser sintering also show a profile of properties untypical of the polymers used when they are processed as powder by additive manufacturing methods to give articles. Thermoplastic elastomers (TPE) are nowadays used in laser sintering. Articles that are produced from the TPEs now available have high residual porosity after solidification, and the original strength of the TPE material is not measurable in the article manufactured therefrom. In practice, these porous components are therefore subsequently infiltrated with liquid, hardening polymers in order to establish the profile of properties required. In spite of this additional measure, strength and elongation remain at a low level. The additional method complexity—as well as the still-inadequate mechanical properties—leads to poor economic viability of these materials.

In laser sintering methods using polymer particles, these are generally processed in a closed volume or chamber in order that the particles can be processed in a heated atmosphere. In this way it is possible to reduce the temperature differential that has to be overcome for sintering of the particles by action of the laser. In general, it can be stated that the thermal properties of the polymer affect the possible processing temperatures in laser sintering methods. Therefore, the prior art has proposed various solutions for such polymers and methods of processing them.

US 2005/0080191 A1 relates to a powder system for use in solid freeform fabrication methods, comprising at least one polymer having reactive properties and fusible properties, wherein the at least one polymer is selected in order to react with a liquid binder and is fusible at a temperature above the melting point or glass transition temperature of the at least one polymer. The at least one polymer may comprise at least one reactive polymer and at least one fusible polymer, and the at least one fusible polymer may have a melting point or glass transition temperature in the range from about 50° C. to about 250° C.

In the prior art, there still exists a need for powder-based additive manufacturing methods in which the components obtained have homogeneous material properties.

SUMMARY

What is therefore proposed is a method and an article as described herein. Advantageous developments are specified in the claims. Unless clearly otherwise apparent from the context, they can be combined in any desired manner.

DETAILED DESCRIPTION

A method of producing a treated article comprises the steps of:
applying a layer of particles to a target surface;
applying a liquid binder to a selected portion of the layer corresponding to a cross section of the article, such that the particles in the selected portion are bonded;
repeating the steps of applying the particles and applying binder for a multitude of layers, such that the bonded portions of the adjacent layers become bonded in order to obtain an article;
where at least some of the particles include a fusible polymer.

The article obtained is at least partly contacted with a liquid heated to $\geq T$ or a powder bed heated to $\geq T$, in order to obtain the treated article, where T is a temperature of $\geq 25°$ C., the liquid is not a solvent or coreactant for the binder present in the article and the fusible polymer, and the powder bed is different than the particles of the fusible polymer.

The contacting of the article with the heated liquid or the heated powder bed is also referred to hereinafter as tempering.

In the method of the invention, an article is built up layer by layer. If the number of repetitions for application and irradiation is sufficiently low, it is also possible to make reference to a two-dimensional article which is to be built. Such a two-dimensional article can also be characterized as a coating. For example, $\geq 2$ to $\leq 20$ repetitions for application and irradiation can be conducted for the build thereof.

It is envisaged that at least some of the particles include a fusible polymer. Preferably, all the particles used in the method include a fusible polymer. It is further preferable that at least 90% by weight of the particles have a particle diameter of $\leq 0.25$ mm, preferably $\leq 0.2$ mm, more preferably $\leq 0.15$ mm. The particles comprising the fusible polymer may have, for example, a homogeneous construction such that no further fusible polymers are present in the particles.

Suitable powders of thermoplastic materials can be produced via various standard processes, for example grinding processes, cryogenic grinding, precipitation processes, spray-drying processes and others.

Suitable fusible polymers for the method of the invention are, for example, all known thermoplastics that can be bonded with an adhesive having a bonding force of $\geq 0.5$ N/mm$^2$ (tensile shear test to DIN EN 1465).

As well as the fusible polymer, the particles may also comprise further additives such as fillers, stabilizers and the like, but also further polymers. The total content of additives in the particles may, by way of example, be $\geq 0.1\%$ by weight to $\leq 40\%$ by weight, preferably $\geq 1\%$ by weight to $\leq 20\%$ by weight.

Useful binders include physically setting adhesives and chemically curing adhesives. The binder may, for example, be an aqueous dispersion adhesive, a solventborne wet adhesive, a polymerization adhesive, a polycondensation adhesive or a polyaddition adhesive.

The binder is preferably applied via a digital application method. This may be a drop-on-demand method, a screen printing method (with masks variable layer by layer), an inkjet method or another dosage method of good controllability. A preferred application method for the binder is a digital printing method such as the inkjet method.

What is envisaged in accordance with the invention is that the liquid is not a solvent or coreactant for the binder present in the article and the fusible polymer. The liquid can thus be regarded as inert. In the context of the present invention, "binder present in the article" includes the bonds that originate from the binder and have formed as a result of physical processes such as evaporation of a solvent or chemical processes such as crosslinking or polymerization reactions and join the particles to one another as an adhesive.

What is meant by "not a solvent" is more particularly that the solubility of the component in question in the liquid at 20° C. is $\leq 10$ g/L, preferably $\leq 1$ g/L, more preferably $\leq 0.1$ g/L and especially preferably $\leq 0.01$ g/L. Particularly suitable liquids also do not lead to any unwanted discoloration of the article and cause the article to swell only reversibly or preferably not at all.

Particularly suitable liquids are also notable in that they can be heated repeatedly to the softening temperature of the thermoplastic without showing degradation phenomena.

The surface tension of the liquid is preferably at least 10 mN/m less or greater than the surface tension of the thermoplastic material of the component.

It is possible with preference to use apolar liquids of low volatility that can be heated to the desired temperatures under pressure, but are easily removable thereafter from the treated article obtained.

After the article has been obtained, it can be freed of powder residues by means of standard methods such as brushing or compressed air.

After the article has been obtained, its dimensional stability can also be increased by means of standard aftertreatment methods such as coating or infusion with suitable coating or infusion materials, for example an aqueous polyurethane dispersion, with subsequent drying and curing at temperatures of 20° C. or more below the softening temperature of the thermoplastic powder, before it comes into contact with the inert liquid or the inert powder material.

In the method of the invention, the article obtained by the additive manufacturing method is contacted at least partly with a heated liquid or a heated powder bed. The resultant article remains dimensionally stable here by virtue of the binder, and the bonded powder particles can be sintered to form the treated article.

This novel inventive method has multiple advantages over the selective laser sintering or and high-speed sintering method which is common practice in the art or standard. For instance, the build space temperature may be low as in a method analogous to binder jetting. All that is required is for the adhesive to cure sufficiently. The subsequent but spatially separable sintering operation makes it possible for processes to be distinctly simplified and less costly, since no heated build spaces are needed. Furthermore, the products from multiple build processes can be sintered together in a downstream process, which can again increase the flexibility and cost efficiency of the build process.

The method of the invention can produce materials having higher density and hardness than standard sintering methods since the binder prevents some of the porosity that arises in a normal sintering method.

The method of the invention also allows the processing of almost any thermoplastic powders since the problems with the build space method in the SLS and HS process do not occur. By the method of the invention, for the first time as far as the inventor is aware, it is also possible to process noncrystalline thermoplastics to give components of high mechanical quality.

The inventive method further preferably achieves complex component geometries since the liquid/the powder bed, analogously to the powder in the SLS and HS method, counteract gravity in a protective manner.

After the sintering, the temperature of the liquid is lowered gradually, preferably to a value of <20° C., preferably <50° C., more preferably <80° C., below the softening temperature within >20 min, preferably >40 min, more preferably >60 min, and the treated body is obtained. Subsequently, the body can be washed if desired.

In a preferred embodiment, after the sintering, the temperature of the liquid is lowered rapidly, preferably to a value of <20° C., preferably <50° C., more preferably >80° C., below the softening temperature within <15 min, preferably <10 min, more preferably <5 min, and the treated body is obtained. Subsequently, the body can be washed if desired. This method is preferred particularly in the case of sintering of amorphous materials.

In a preferred embodiment, the binder selected is a binder that cures under crosslinking. In that case, as the binder cures, covalent bonds are formed, which lead at least partly to a three-dimensional mesh structure in the cured binder. In a further preferred embodiment, the binder is selected from: radiation-curing binders, binders that cure by means of free-radical initiators, binders that cure by means of increasing temperature, two-component reactive binders, and mixtures of the binders and curing variants mentioned. Preference is given to binders based on (meth)acrylates, isocyanates, polyurethanes, epoxides, or cyanoacrylates or mixtures of at least two of these.

In a further preferred embodiment, binder present in the article, for example after crosslinking or film formation, has a softening temperature greater than the softening temperature of the fusible polymer, where the softening temperature is defined as the point of intersection of the curves for storage modulus E' and loss modulus E" in a temperature-dependent dynamic-mechanical analysis.

In a further preferred embodiment, binder present in the article (for example after crosslinking or film formation), in the tensile shear test according to DIN EN 1465, in the bonding of test specimens made from the fusible polymer, has a bonding force of $\geq 0.5$ N/mm$^2$ (preferably $\geq 1$ N/mm$^2$, more preferably $\geq 2$ N/mm$^2$).

In a further preferred embodiment, during the contacting of the article with the heated liquid, the liquid is put under pressure at least at times. Preferably, the pressure (in relative terms, i.e. gauge pressure) is $\geq 1$ bar to $\leq 100$ bar, preferably $\geq 2$ bar to $\leq 50$ bar, more preferably $\geq 3$ bar to $\leq 20$ bar and most preferably $\geq 4$ bar to $\leq 10$ bar. This pressurization can be conducted in suitable autoclaves made of glass or metal by means of injection of a suitable gas or by mechanical reduction of the autoclave volume. In the application of elevated pressure to the liquid, the temperature of the heated liquid may be lowered, for example by $\geq 5°$ C. or $\geq 10°$ C., compared to process variants without pressurization.

In a further preferred embodiment, the temperature T, expressed in degrees Celsius, is $\geq 1°$ C., preferably $\geq 2°$ C., more preferably $\geq 5°$ C., below the softening temperature of the fusible polymer, where the softening temperature is defined as the point of intersection of the curves for storage modulus E' and loss modulus E" in a temperature-dependent dynamic-mechanical analysis.

In a further preferred embodiment, the temperature T, expressed in degrees Celsius, is additionally $\leq 95\%$ (preferably $\leq 90\%$, more preferably $\leq 85\%$) of the breakdown temperature of the binder after crosslinking, where the breakdown temperature is defined as the temperature at which a loss of mass of $\geq 10\%$ is established in a thermogravimetric analysis at a heating rate of 5° C./min in an air flow.

In a further preferred embodiment, the temperature T is chosen such that the modulus of elasticity E' at this temperature, ascertained by means of dynamic-mechanical analysis of the fusible polymer, is $\geq 10^5$ Pa to $\leq 10^8$ Pa, preferably $\geq 5 \cdot 10^5$ Pa to $\leq 5 \cdot 10^7$ Pa, more preferably $\geq 1 \cdot 10^6$ Pa to $\leq 1 \cdot 10^7$ Pa.

In a further preferred embodiment, the contacting of the article obtained with the liquid or the powder bed is conducted for $\geq 5$ minutes to $\leq 24$ hours, preferably $\geq 30$ minutes to $\leq 18$ hours, more preferably $\geq 1$ hour to $\leq 12$ hours.

In a further preferred embodiment, the temperature T is $\geq 40°$ C. to $\leq 300°$ C., preferably $>50°$ C. to $\leq 280°$ C. and more preferably $\geq 80°$ C. to $\leq 250°$ C.

In a further preferred embodiment, the fusible polymer is selected from: PEEK, PAEK, PEKK, polyethersulfone, polyimide, polyetherimide, polyester, polyamide, polycarbonate, polyurethane, polyvinylchloride, polyoxymethylene, polyvinylacetate, polyacrylate, polymethacrylate, TPE (thermoplastic elastomers), polystyrene, polyethylene, polypropylene or mixtures of at least two of the polymers mentioned.

Preferably, the fusible polymer is a polyurethane obtainable at least in part from the reaction of aromatic and/or aliphatic polyisocyanates with suitable (poly)alcohols and/or (poly)amines or blends thereof. Preferably, at least a proportion of the (poly)alcohols used comprises those from the group consisting of: linear polyester polyols, polyether polyols, polycarbonate polyols, polyacrylate polyols or a combination of at least two of these. In a preferred embodiment, these (poly)alcohols or (poly)amines bear terminal alcohol and/or amine functionalities. In a further preferred embodiment, the (poly)alcohols and/or (poly)amines have a molecular weight of 52 to 10 000 g/mol. Preferably, these (poly)alcohols or (poly)amines as feedstocks have a melting point in the range from 5 to 150° C. Preferred polyisocyanates that can be used at least in part for preparation of the fusible polyurethanes are TDI, MDI, HDI, PDI, H12MDI, IPDI, TODI, XDI, NDI and decane diisocyanate. Particularly preferred polyisocyanates are HDI, PDI, H12MDI, MDI and TDI.

It is likewise preferable that the fusible polymer is a polycarbonate based on bisphenol A and/or or bisphenol TMC.

In a further preferred embodiment, the liquid is selected from: silicone oils, fluorinated hydrocarbons, polyethylene waxes, saltwater, metal melts, ionic liquids and mixtures of at least two of the liquids mentioned. In the case of saltwater, preference is given to a saturated NaCl solution.

In a further preferred embodiment, the powder bed contains particles of glass, polytetrafluoroethylene, silicon dioxide, aluminum oxide, metals, low- and high-melting salts, water-soluble salts, acid-soluble salts, base-soluble salts or mixtures of at least two of these. Particular preference is given here to powders having a high thermal conductivity of $\geq 0.2$ $Wm^{-1}K^{-1}$. Thermal conductivity can be determined here as described in the publication *TK04 Application Note, 2015, TeKa, Berlin, Germany "Testing fragments and powder"*.

Examples of particularly suitable combinations of fusible polymers and binders in the method of the invention are detailed hereinafter. According to the form of administration, the binders may take the form here of aqueous dispersions, solventborne adhesives or 100% reactive adhesives. Reactive adhesives in the context of this invention are understood to mean adhesives that react through reaction of the adhesive components with themselves to form new compounds and/or through reaction of the adhesive components with the powders to form new compounds. The reactions may be reacted by contact of the components with themselves and/or the powder and/or by heat and/or by addition of catalyst (catalyst activation) and/or by radiative activation and/or by drying of the solvent or of the dispersion to form a film. Also in accordance with the invention is the action of an adhesive by film formation on account of drying from solution or dispersion, where typical physical interactions with the powder lead to bonding. As well as the use of one-component adhesives, preference is given to the use of at least two-component adhesives. Adhesives in the context of the invention are among the binders, and these are used synonymously to some degree.

TABLE 1

Suitable combinations of fusible polymers and preferably solid binders

| Fusible polymer | Binder |
| --- | --- |
| Thermoplastic polyurethane (TPU) | Polyurethane adhesive |
| Thermoplastic polyurethane (TPU) | Cyanoacrylate adhesive |
| Thermoplastic polyurethane (TPU) | UV-curing (meth)acrylate adhesives |
| Thermoplastic polyurethane (TPU) | Epoxy adhesive |
| Polycarbonate (PC) | UV-curing (meth)acrylate adhesives |
| Polycarbonate (PC) | Polyurethane adhesive |
| Polymethylmethacrylate (PMMA) | UV-curing (meth)acrylate adhesives |
| Polyamide (PA) | Epoxy adhesive |
| Polyamide (PA) | Polyurethane adhesive |
| Polyamide (PA) | Cyanoacrylate adhesive |
| Polypropylene (PP) | UV-curing (meth)acrylate adhesives |

Examples of particularly suitable combinations of fusible polymers and liquids in the method of the invention are detailed hereinafter.

TABLE 2

Suitable combinations of fusible polymers and liquids

| Fusible polymer | Liquid |
| --- | --- |
| Thermoplastic polyurethane (TPU) | Saltwater, silicone oil, PE waxes |
| Polycarbonate (PC) | Silicone oil, PE waxes |
| Polymethylmethacrylate (PMMA) | Saltwater, PE waxes, silicone oil |
| Polyamide (PA) | Silicone oil, hydrofluorocarbons |
| Polyvinylchloride (PVC) | Silicone oil, PE wax |
| Polyetheretherketone (PEEK) | Silicone oil |
| Polyetherimide (PEI) | Silicone oil |
| Polypropylene (PP) | Silicone oil, saltwater |

Examples of particularly suitable combinations of binders and liquids in the method of the invention are detailed hereinafter.

TABLE 3

Suitable binders and liquids

| Binder | Liquid |
| --- | --- |
| Polyurethane adhesive | Silicone oil, hydrofluorocarbons, saltwater, PE waxes |
| Cyanoacrylate adhesive | Silicone oil, hydrofluorocarbons, PE waxes |
| UV-curing (meth)acrylate adhesives | Saltwater, silicone oil, PE waxes |
| Epoxy adhesive | Silicone oil, hydrofluorocarbons, PE waxes |

Examples of particularly suitable combinations of fusible polymers, binders and liquids in the method of the invention are detailed hereinafter.

TABLE 4

Suitable combinations of fusible polymers, binders and liquids

| Fusible polymer | Binder | Liquid |
| --- | --- | --- |
| TPU | Polyurethane adhesive | Silicone oil, hydrofluorocarbons, saltwater, PE waxes |
| TPU | Cyanoacrylate adhesive | Silicone oil, hydrofluorocarbons, PE waxes |
| PC | UV-curing (meth)acrylate adhesives | Silicone oil, hydrofluorocarbons, PE waxes |
| PC | Polyurethane adhesive | Silicone oil, hydrofluorocarbons, PE waxes |
| PMMA | UV-curing (meth)acrylate adhesives | Saltwater, silicone oil, PE waxes |
| PA | Epoxy adhesive | Silicone oil, hydrofluorocarbons, PE waxes |
| PA | Polyurethane adhesive | Silicone oil, hydrofluorocarbons, PE waxes |
| PA | Cyanoacrylate adhesive | Silicone oil, hydrofluorocarbons, PE waxes |
| PP | UV-curing (meth)acrylate adhesives | Silicone oil, saltwater, ionic liquids, salt melts |

Examples of particularly suitable combinations of fusible polymers, suitable binders and powders in the method of the invention are detailed hereinafter.

TABLE 5

Suitable combinations of fusible polymers, binders and powders

| Fusible polymer | Binder | Powder bed |
| --- | --- | --- |
| Thermoplastic polyurethane (TPU) | Polyurethane adhesive | NaCl, $MgSO_4$, $MgCl_2$, $CaCO_3$, glass, metals, $SiO_2$, $Al_2O_3$. |
| Thermoplastic polyurethane (TPU) | UV-curing (meth)acrylate adhesive | NaCl, $MgSO_4$, $MgCl_2$, $CaCO_3$, glass, metals, $SiO_2$, $Al_2O_3$. |

TABLE 5-continued

Suitable combinations of fusible polymers, binders and powders

| Fusible polymer | Binder | Powder bed |
| --- | --- | --- |
| Thermoplastic polyurethane (TPU) | Epoxy adhesive | NaCl, $MgSO_4$, $MgCl_2$, $CaCO_3$, glass, metals, $SiO_2$, $Al_2O_3$. |
| Polycarbonate (PC) | UV-curing (meth)acrylate adhesive | NaCl, $MgSO_4$, $MgCl_2$, $CaCO_3$, glass, metals, $SiO_2$, $Al_2O_3$. |
| Polycarbonate (PC) | Polyurethane adhesive | NaCl, $MgSO_4$, $MgCl_2$, $CaCO_3$, glass, metals, $SiO_2$, $Al_2O_3$. |
| Polymethylmethacrylate (PMMA) | UV-curing (meth)acrylate adhesive | NaCl, $MgSO_4$, $MgCl_2$, $CaCO_3$, glass, metals, $SiO_2$, $Al_2O_3$. |
| Polyamide (PA) | Epoxy adhesive | NaCl, $MgSO_4$, $MgCl_2$, $CaCO_3$ |
| Polypropylene (PE) | UV-curing (methacrylate adhesive) | NaCl, $MgSO_4$, $MgCl_2$, $CaCO_3$, starch, sugar, glass, metals, $SiO_2$, $Al_2O_3$. |
| Acrylonitrile-butadiene-styrene (ABS) | Epoxy adhesive | NaCl, $MgSO_4$, $MgCl_2$, $CaCO_3$, starch, sugar, glass, metal powder, $SiO_2$, $Al_2O_3$. |
| Polyethylene (PE) | UV-curing (methacrylate adhesive) | NaCl, $MgSO_4$, $MgCl_2$, $CaCO_3$, starch, sugar, glass, metals, $SiO_2$, $Al_2O_3$. |
| Polychloroprene rubber (CR) | Polychloroprene adhesive | NaCl, $MgSO_4$, $MgCl_2$, $CaCO_3$, starch, sugar, glass, metals, $SiO_2$, $Al_2O_3$. |
| Styrene-butadiene block copolymers (SBS) | UV-curing (methacrylate adhesive) | NaCl, $MgSO_4$, $MgCl_2$, $CaCO_3$, starch, sugar, glass, metals, $SiO_2$, $Al_2O_3$. |
| Polyvinylchloride (PVC) | Polyurethane adhesive | NaCl, $MgSO_4$, $MgCl_2$, $CaCO_3$, starch, sugar, glass, metals, $SiO_2$, $Al_2O_3$. |
| Polyvinylacetate (PVA) | Polyvinylacetate adhesive | NaCl, $MgSO_4$, $MgCl_2$, $CaCO_3$, starch, sugar, glass, metals, $SiO_2$, $Al_2O_3$. |
| Polyfluoroethylene (PTFE) | Epoxy adhesive | NaCl, $MgSO_4$, $MgCl_2$, glass, metal powder, $SiO_2$, $Al_2O_3$, glass, metals, $SiO_2$, $Al_2O_3$. |
| Polyetheretherketone (PEEK) | Epoxy adhesive | NaCl, $MgSO_4$, $MgCl_2$, glass, metals, $SiO_2$, $Al_2O_3$. |
| Nylon-6 | Epoxy adhesive | NaCl, $MgSO_4$, $MgCl_2$, $CaCO_3$, glass, metal powder, $SiO_2$, $Al_2O_3$. |
| Nylon-6,6 | Epoxy adhesive | NaCl, $MgSO_4$ $MgCl_2$, $CaCO_3$, glass, metals, $SiO_2$, $Al_2O_3$. |
| Nylon-12 | Polyurethane adhesive | NaCl, $MgSO_4$, $MgCl_2$, $CaCO_3$, glass, metals, $SiO_2$, $Al_2O_3$. |
| Nylon-4,6 | Epoxy adhesive | NaCl, $MgSO_4$, $MgCl_2$, $CaCO_3$, glass, metals, $SiO_2$, $Al_2O_3$. |
| Nylon-11 | Epoxy adhesive | NaCl, $MgSO_4$, $MgCl_2$, $CaCO_3$, glass, metals, $SiO_2$, $Al_2O_3$. |
| Copolyamide | Polyurethane adhesive | NaCl, $MgSO_4$, $MgCl_2$, $CaCO_3$, glass, metals, $SiO_2$, $Al_2O_3$. |
| Copolyesteramide | Polyurethane adhesive | NaCl, $MgSO_4$, $MgCl_2$, $CaCO_3$, glass, metals, $SiO_2$, $Al_2O_3$. |
| Copolyetheramides (PEBA) | Polyurethane adhesive | NaCl, $MgSO_4$, $MgCl_2$, $CaCO_3$, glass, metals, $SiO_2$, $Al_2O_3$. |
| Polyaryletherketone (PEAK) | Epoxy adhesive | NaCl, $MgSO_4$, $MgCl_2$, $CaCO_3$, glass, metals, $SiO_2$, $Al_2O_3$. |
| Polyimides | Epoxy adhesive | NaCl, $MgSO_4$, $MgCl_2$, $CaCO_3$, glass, metals, $SiO_2$, $Al_2O_3$. |
| Polyarylsulfones | Epoxy adhesive | NaCl, $MgSO_4$, $MgCl_2$, $CaCO_3$, glass, metals, $SiO_2$, $Al_2O_3$. |

When metal powders are used, preference is given to working under inert gas atmosphere, or at least surface-oxidized or oxidation-resistant metal powders are used to rule out metal fires.

Examples of particularly suitable combinations of metals and suitable binders and powders in the method of the invention are detailed hereinafter. Here too, the method is preferably effected under inert conditions, for example through use of inert gas.

TABLE 6

Suitable combinations of metals, binders and powders

| Metals | Binder | Powder bed |
| --- | --- | --- |
| Copper | UV-curing (meth)acrylate adhesive | $Al_2O_3$, $SiO_2$ |
| Steel (or iron alloys) | UV-curing (meth)acrylate adhesive | $Al_2O_3$, $SiO_2$ |
| Aluminum | Epoxy adhesive | $Al_2O_3$, $SiO_2$ |

TABLE 6-continued

Suitable combinations of metals, binders and powders

| Metals | Binder | Powder bed |
|---|---|---|
| Titanium | UV-curing (meth)acrylate adhesive | $Al_2O_3$, $SiO_2$ |
| Brass | UV-curing (meth)acrylate adhesive | $Al_2O_3$, $SiO_2$ |
| Iron | UV-curing (meth)acrylate adhesive | $Al_2O_3$, $SiO_2$ |

The present invention further provides a treated article obtainable by a method as described in detail above. Such an article may especially have improved mechanical properties. The article produced by the method of the invention preferably has a surface having an average roughness Ra (DIN EN ISO 4287) of ≤500 μm, preferably of ≤200 μm, or preferably of ≤100 μm, or preferably within a range from 10 to 500 μm, or more preferably within a range from 50 to 100 μm.

The article produced by the method of the invention is particularly notable for its particularly high stability, and at the same time also for particularly homogeneous mechanical properties.

With regard to mechanical properties, particular mention should be made of density and tensile strength, which is especially the stability of the article in the plane of the layer.

In this regard, it is particularly preferable that, in the tensile test in accordance with DIN EN ISO 527-2, the product of the method of the invention has a tensile strength greater than the tensile strength of the untempered article. In other words, the treated articles after the tempering have a tensile strength greater than before the tempering. It is preferable here that the treated articles after the tempering have a tensile strength greater than the tensile strength of the untreated article, preferably by a magnitude of ≥10%, more preferably by a magnitude of ≥20%, further preferably by a magnitude of ≥30%, further preferably by a magnitude of ≥50%, further preferably by a magnitude of ≥100%, where the values described above relate to the tensile strength of the untreated article or of the article prior to the tempering.

It is further preferable that the density of the treated article is greater than the density of the untreated article, or in other words that the density after tempering in a medium suitable in accordance with the invention is greater than before the tempering. The difference in density is typically manifested in that the tempered product or tempered article has smaller geometric dimensions which the untempered article. It is particularly preferable here that the density of the treated article is greater than the density of the untreated article, preferably by a magnitude of ≥1%, preferably by a magnitude of ≥2%, further preferably by a magnitude of ≥5%, further preferably by a magnitude of ≥10%, based on the density of the untreated article or based on the density of the article before tempering.

These mechanical properties in particular can be improved by the method described here by comparison with conventional additively manufactured articles.

In a preferred embodiment, in the tensile test in accordance with DIN EN 1465, the layers of the treated body have a shear strength with respect to one another of ≥1 $N/mm^2$ (preferably ≥1.5 $N/mm^2$, more preferably ≥2 $N/mm^2$).

For further advantages and technical features of the method of the invention and of the article of the invention, reference is made to the description of the production of an article that follows, and vice versa.

EXAMPLES

Detailed hereinafter are various experiments in which an article produced by binder jetting or a method analogous to binder jetting is examined. The article comprising a powder and an adhesive that holds the powder together was produced by means of an additive layer-building manufacturing process and examined for its properties before and after the tempering in a medium suitable in accordance with the invention.

Test Methods:
Tensile test: according to DIN EN ISO 527-2.
Grain sizes or particle diameter: unless specified otherwise, grain sizes or particle sizes were ascertained by means of laser diffraction (HELOS particle size analysis)
Starting Materials:
Silicone oil (silicone oil bath): M 50 El oil from Momentive™, colorless
NaCl: edible salt with grain size from 0.1 to 0.9 mm.
Sand (filter sand): quartz sand with grain size from 0.4 to 0.8 mm.
S1 tensile specimens based on Polypor C (PPC), produced by the binder jetting method based on PMMA, sourced from Voxeljet AG and used as sourced.
TPU: Desmopan® 3787A was sourced from Covestro Deutschland AG.
Polycarbonate: Makrolon® 2408 was sourced from Covestro Deutschland AG.
Polyurethane adhesive: Dispercoll® U54, 50% polyurethane adhesive dispersion, was sourced from Covestro Deutschland AG.

Some of the S1 specimens based on PMMA that were obtained were fully covered with pulverulent NaCl, by encasing the specimens with a salt layer of thickness at least 1 cm in each spatial direction, and heated in an air circulation oven for 140° C. and 160° C. for 2 h and 4 h. This operation is also referred to as tempering. After the tempering, the vessel containing NaCl powder and tensile specimens was taken out of the air circulation oven and gradually cooled down to 23° C. within 30 min before the specimens were removed and separated mechanically from the salt.

The resultant S1 specimens of PMMA were stored at 23° C. for 24 h and then tested by the tensile test according to DIN EN ISO 527-2.

The results are listed as sample 1 to 5 in table 7. Comparative experiments are identified by *.

The TPU powder used was obtained by cryogenic grinding of Desmopan® 3787A, sourced from Covestro Deutschland AG. For this purpose, the TPU was blended with 0.2% by weight, based on TPU, of hydrophobized fumed silica as flow agent (Aerosil® R972 from Evonik), and the mixture was processed mechanically under cryogenic conditions (cryogenic comminution) in a pinned-disk mill to give powder and then classified by means of a sieving machine. 90% by weight of the composition had a particle diameter of less than 140 μm (measured by means of laser diffraction (HELOS particle size analysis)).

For simulation of the binder jetting method, the TPU powder was mixed with Dispercoll® U54, a polyurethane dispersion, sourced from Covestro Deutschland AG, in a mass ratio of 1:1, and layered in 8*1 mm mutually superposed layers with a coating bar into an 8*20 cm rectangular mold with a Teflon base, with intermediate partial drying at 23° C. for 20 min in each case. For this purpose, the walls of the mold were elevated with adhesive tape by 1 mm in each coating operation. After further drying of the blend at 23° C. for 24 h and at 80° C. for 1 h, the slab was cut into 1 cm*8 cm bars and some of the bars obtained were encased in accordance with the invention with pulverulent NaCl. The bars were encased with a salt layer of thickness at least 1 cm in each spatial direction and heated in an air circulation oven at 180° C. for 1 h (tempering). After the tempering, the vessel containing NaCl powder and test specimens was taken out of the air circulation oven and cooled down to 23° C. within 30 min before the specimens were removed and separated mechanically from the salt.

The resultant specimens were then stored for 24 h and then tested by the tensile test according to DIN EN ISO 527-2 (the test specimen shapes do not conform to DIN EN ISO 527-2).

The results for tensile specimens that were manufactured from TPU are listed as sample 6 and 7 in table 7. Comparative experiments are identified by *.

The polycarbonate powder used was obtained by cryogenic grinding of Makrolon®2408, sourced from Covestro Deutschland AG. For this purpose, the polycarbonate was blended with 0.2% by weight, based on polycarbonate, of hydrophobized fumed silica as flow agent (Aerosil® R972 from Evonik), and the mixture was processed mechanically under cryogenic conditions (cryogenic comminution with liquid nitrogen) in a pinned-disk mill to give powder and then classified by means of a sieving machine. 90% by weight of the composition had a particle diameter of less than 140 μm (measured by means of laser diffraction (HELOS particle size analysis)).

For simulation of the binder jetting method, the polycarbonate powder was mixed with Dispercoll® U54, a polyurethane dispersion, sourced from Covestro Deutschland AG, in a mass ratio of 1:1, and layered in 8*1 mm mutually superposed layers by means of a coating bar into an 8*20 cm rectangular mold with a Teflon base, with intermediate partial drying at 23° C. for 20 min in each case. For this purpose, the walls of the mold were elevated with adhesive tape by 1 mm in each coating operation. After further drying of the blend at 23° C. for 24 h and at 80° C. for 1 h, the resultant slab was cut into about 1 cm*8 cm bars and some of the bars obtained were encased in accordance with the invention with pulverulent NaCl, by encasing the bars with a salt layer at least of thickness 1 cm in each spatial direction, and heated in an air circulation oven at 180° C. for 1 h. After the tempering, the vessel containing NaCl powder and test specimens was taken out of the air circulation oven and cooled down to 23° C. within 30 min before the specimens were removed and separated mechanically from the salt.

The resultant specimens were then stored for 24 h and then tested by the tensile test in accordance with DIN EN ISO 527-2 (the test specimen shapes do not conform to DIN EN ISO 527-2).

The results for tensile specimens that were manufactured from polycarbonate are listed as sample 8 and 9 in table 7. Comparative experiments are identified by *.

Owing to the high stresses, specimens 6 to 9 slipped in the jaws of the tensile tester, and so only the tensile moduli were considered in a comparative manner.

TABLE 7

Tempering in NaCl

| PMMA | | Maximum stress MPa | Breaking stress MPa | Elongation at break % | Test specimen height mm | Test specimen width mm |
|---|---|---|---|---|---|---|
| Specimen 1* | Reference untreated | 240.1 | 3.0 | 2.9 | 1.4 | 4.0 | 10.0 |
| Specimen 2 | 1 h 140° C. | 314.6 | 3.6 | 3.5 | 1.2 | 3.9 | 10.0 |
| Specimen 3 | 2 h 140° C. | 335.1 | 4.0 | 4.0 | 1.3 | 3.9 | 9.9 |
| Specimen 4 | 1 h 160° C. | 316.3 | 3.6 | 3.5 | 1.1 | 3.8 | 9.9 |
| Specimen 5 | 2 h 160° C. | 334.2 | 4.3 | 4.1 | 1.4 | 3.8 | 9.8 |

| | | Tensile modulus MPa | Test specimen height mm | Test specimen width mm |
|---|---|---|---|---|
| TPU | | | | |
| Specimen 6* | Reference untreated | 3.7 | 6.2 | 10.1 |
| Specimen 7 | | 17.0 | 5.3 | 9.9 |
| Polycarbonate | | | | |
| Specimen 8* | Reference untreated | 51.9 | 6.6 | 10.2 |
| Specimen 9 | | 123.2 | 6.3 | 10.0 |

Identified by * means comparative experiment

Some of the S1 specimens based on PMMA obtained were heated in accordance with the invention in silicone oil for 110° C. and 130° C. for 1 h in an air circulation oven. After the tempering, the vessel containing silicone oil and tensile specimens was taken out of the air circulation oven and gradually cooled down to 23° C. within 30 min before the specimens were removed and largely freed of residues of silicone oil with the aid of absorptive paper.

The resultant S1 specimens of PMMA were stored at 23° C. for 24 h and then tested by the tensile test according to DIN EN ISO 527-2.

The results for tensile specimens that were manufactured from PMMA and tempered in silicone oil are listed as sample 10, 11 and 12 in table 8. Comparative experiments are identified by *.

TABLE 8

Tempering in silicone oil

| PMMA | | Tensile modulus MPa | Maximum stress MPa | Breaking stress MPa | Breaking stress % | Test specimen height mm | Test specimen width mm |
|---|---|---|---|---|---|---|---|
| Specimen 10* | Reference Untreated | 240 | 3.0 | 2.9 | 1.4 | 4.0 | 10.0 |
| Specimen 11 | 1 h at 110° C. | 267 | 3.25 | 3.24 | 1.4 | 3.97 | 9.95 |
| Specimen 12 | 1 h at 130° C. | 292 | 3.49 | 3.49 | 1.4 | 3.89 | 9.96 |

The comparison of the results for the tensile specimens produced by the method of the invention compared to the tensile specimens not produced in accordance with the invention shows a distinct improvement in the mechanical properties after thermal treatment according to the invention compared to the untempered specimens.

Moreover, the density of the specimens tempered in accordance with the invention increased, which can be inferred from the lower heights and widths of the test specimens after the tempering.

Moreover, tempering in suitable inert media having higher density than air achieved a distinct improvement in dimensional stability of the bodies by comparison with freely tempered test specimens since these were subjected less effectively to gravity, which is reflected in the increase in the values of tensile modulus, maximum stress and breaking stress of the test specimens. This is an important improvement in properties particularly in the case of delicate build bodies.

Moreover, the surface roughness of the samples tempered in accordance with the invention tends to be improved in the direction of a lower surface roughness. This was ascertained by tactile tests on the surfaces. This effect becomes particularly clear when non-dissolving and -swelling tempering fluids or fine powders are used.

The invention claimed is:

1. A method of producing a treated article, comprising:
applying a layer of particles to a target surface, wherein at least some of the particles include a fusible polymer;
selectively binding particles of the layer by applying a liquid binder to a selected portion of the layer corresponding to a cross section of an article, wherein the liquid binder binds the particles in the selected portion to form a bonded portion;
repeating the steps of applying particles and selectively binding particles for a multitude of layers, wherein the repeating further comprises binding bonded portions of adjacent layers to obtain a bonded article; and
contacting at least a portion of the bonded article with a liquid heated to >T or a powder bed heated to >T and sintering the portion of the bonded article to form a treated article, wherein T is a temperature of >25° C., wherein the liquid is not a solvent or coreactant for the liquid binder and the fusible polymer, and the powder bed is different than the particles of the fusible polymer.

2. The method as claimed in claim 1, wherein the binder cures under crosslinking.

3. The method as claimed in claim 1, wherein the binder has a softening temperature greater than a softening temperature of the fusible polymer, wherein the softening temperature is defined as the point of intersection of the curves for storage modulus E' and loss modulus E" in a temperature-dependent dynamic-mechanical analysis.

4. The method as claimed in claim 1, wherein the binder has a bonding force of 22 0.5 N/mm2 based on a tensile shear test according to DIN EN 1465 of test specimens made from the fusible polymer.

5. The method as claimed in claim 1, wherein the liquid is put under pressure at least at times during the contacting of the article with the heated liquid.

6. The method as claimed in claim 1, wherein the temperature T is additionally >1° C. below a softening temperature of the fusible polymer, wherein the softening temperature is defined as the point of intersection of the curves for storage modulus E' and loss modulus E" in a temperature-dependent dynamic-mechanical analysis.

7. The method as claimed in claim 1, wherein the temperature T is additionally >95% of a breakdown temperature of binder present in the article, wherein the breakdown temperature is defined as the temperature at which a loss of mass of >10% is established in a thermogravimetric analysis at a heating rate of 5° C./min in an air flow.

8. The method as claimed in claim 1, wherein the temperature T is additionally selected such that a modulus of elasticity of the fusible polymer at the temperature T is >105 Pa to <108 Pa, said modulus of elasticity being based on a temperature-dependent dynamic-mechanical analysis.

9. The method as claimed in claim 1, wherein the contacting of the bonded article with the liquid or the powder bed is conducted for >5 minutes to <24 hours.

10. The method as claimed in claim 1, wherein the temperature T is >40° C. to <300° C.

11. The method as claimed in claim 1, wherein the fusible polymer comprises PEEK, PAEK, PEKK, polyethersulfones, polyimide, polyetherimide, polyesters, polyamides, polycarbonates, polyurethanes, polyvinylchloride, polyoxymethylene, polyvinylacetate, polyacrylates, polymethacrylates, TPE, polystyrene, polyethylene, polypropylene, or a blend thereof.

12. The method as claimed in claim 1, wherein the liquid comprises a silicone oil, a fluorinated hydrocarbon, a polyethylene wax, saltwater, a metal melt, an ionic liquid, or a mixture thereof.

13. The method as claimed in claim 1, wherein the powder bed comprises particles of glass, polytetrafluoroethylene, silicon dioxide, aluminum oxide, metal, or a mixture thereof.

* * * * *